United States Patent [19]

Goto

[11] 4,363,456
[45] Dec. 14, 1982

[54] MAGNETIC RECORDING TAPE CASSETTE

[75] Inventor: Shinichi Goto, Takatsuki, Japan

[73] Assignee: Hitachi Maxell, Ltd., Osaka, Japan

[21] Appl. No.: 206,689

[22] Filed: Nov. 14, 1980

[30] Foreign Application Priority Data

Nov. 15, 1979 [JP] Japan .......................... 54/158928[U]

[51] Int. Cl.³ .......................... G03B 1/04; G11B 23/04
[52] U.S. Cl. .................................... 242/197; 242/199
[58] Field of Search .................... 242/194, 197, 199; 206/389; 360/96, 132, 85, 92, 93; 352/72, 78 R

[56] References Cited

U.S. PATENT DOCUMENTS

| | | | |
|---|---|---|---|
| 3,411,731 | 11/1968 | Kelley | 242/199 |
| 3,980,255 | 9/1976 | Serizawa | 242/198 |
| 4,004,752 | 1/1977 | Kamaya | 242/198 |

*Primary Examiner*—Leonard D. Christian
*Attorney, Agent, or Firm*—Birch, Stewart, Kolasch & Birch

[57] ABSTRACT

In a magnetic recording tape cassette comprising a bottom case half, a top case half, the case halves are combined together and fastened by tapping screws, and a lid member is hinged and supported on the top case half so as to close the openings in the front wall of the cassette case to protect a magnetic recording tape. Each of the tapping screws are adapted to be entered through the top case half.

5 Claims, 6 Drawing Figures

MAGNETIC RECORDING TAPE CASSETTE

The present invention relates to a magnetic recording tape cassette, and more particularly to a recording tape cassette having a protective lid hinged on the tape cassette to close the front side of the tape cassette to protect the magnetic recording tape. The lid can be opened when the tape cassette is loaded in a tape recorder.

The tape cassette having such a protective lid as mentioned above is generally used for recording or reproducing video signals and thus is called a video tape cassette.

In a conventional tape cassette, a bottom case half and the top case half are mated and fastened together by means of a plurality of tapping screws, entering through the holes in the bottom case half. Therefore, when the conventional video tape cassettes are manufactured, after a pair of reels with a recording tape is accommodated in the bottom case half and a top case half, to which a protective lid member is hinged, is mated on the bottom case half, the mated cassette case must be reversed so as to insert a plurality of screws through the holes in the bottom case to fasten them together. Thus, the manufacturing process becomes complicated.

Furthermore, as disclosed in U.S. Pat. No. 4,004,752, such a lid is attached on the top case in such a manner that a pin provided on one leg portion of the lid is inserted in a recess defined in the corresponding side wall of the top case and a second pin projected from the other leg of the lid is merely laid in a recess in the top case. Therefore, the attached lid is apt to be disengaged from the top case half. In order to eliminate the drawback as mentioned above, it might be proposed that both of the pins of the lid be inserted in respective holes in the top case. However, since the distance between the inside opposed faces of the pins formed on the lid is shorter than the length of the cassette case, when the lid is attached on the top case by insertion of the pins into the corresponding holes defined in the top case, the legs of the lid must be deformed or spread outwardly.

This proposed improvement, however, is not without difficulty in that the lid would be easily damaged since both of the legs of the lid must be bent outwardly when the pins are entered at the corresponding holes of the case.

Accordingly, an essential object of the present invention is to provide a magnetic recording tape cassette having a lid portion with leg extensions which can be manufactured without causing the lid to be broken when it is attached to the top case half by defining a pair of openings or recesses on the lid for enabling deformation of the legs of the lid easily when the lid is attached to the top case half.

Another object of the present invention is to provide a magnetic recording tape cassette which can be manufactured easily when a top case half and a bottom case half are fastened together by screws.

According to the present invention there is provided a magnetic recording tape cassette which comprises a bottom case half, a top case half mated with the bottom case half to form a cassette case fastened by screws, a magnetic recording tape wound on a pair of reels accommodated inside the cassette case, said magnetic recording tape being adapted to pass along a plurality of openings defined in the front wall of the cassette case and along a pair of guide pins provided near the respective front corners of the cassette case, a protective lid member movably mounted on the top case half so as to close or open the openings of the cassette case, said lid member including generally a horizontal upper plate and a vertical lid plate to form a reversed L configuration in cross section, a pair of legs on opposite sides of the horizontal plate which serve to anchor the lid member to the top case half the horizontal plate being placed on the frontmost top face of the roof portion of the top case half, and a pair of openings or recesses defined in the horizontal upper plate juxtapositioned to each leg, each of said recesses having an arcuated configuration circumscribing the screw holes in the front portion of the top case half and providing a thinner section adjacent the leg extensions so as to help deformation of the lid member when the legs are expanded outwardly for engagement with the corresponding holes in the top case half of the cassette case.

The present invention will be hereinafter described with reference to a preferred embodiment of a magnetic recording tape cassette with reference to the attached drawings in which, FIG. 1 is a plan view showing the top half of a preferred embodiment of a magnetic recording tape cassette according to the present invention;

Figure 1:
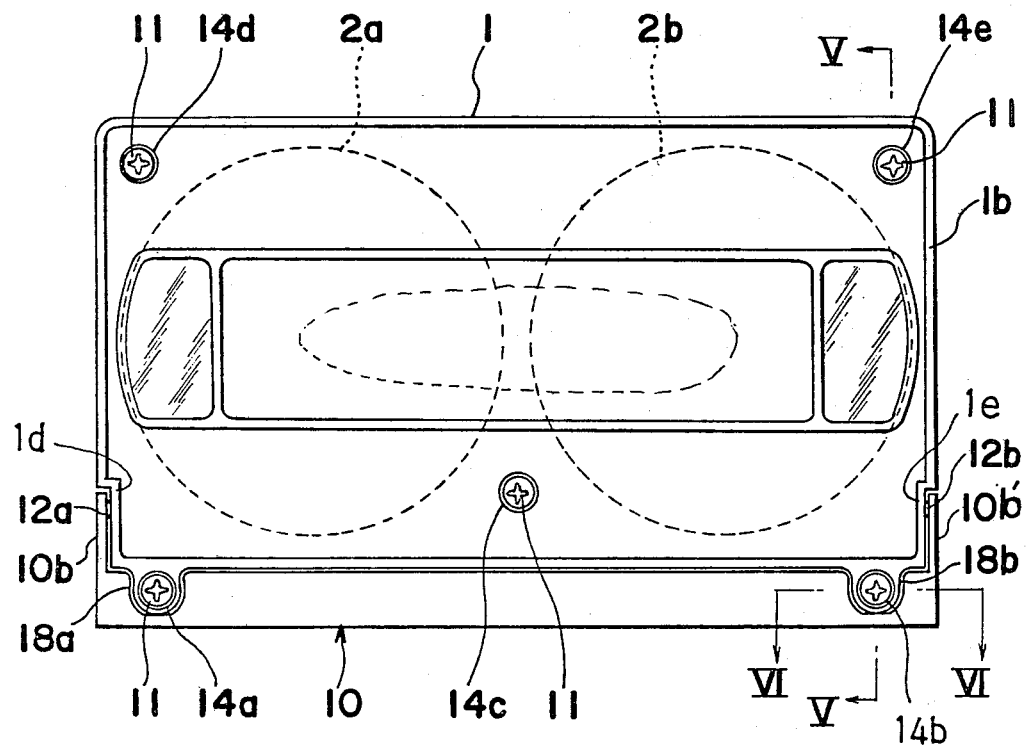

Referring to FIG. 1 through FIG. 6, a cassette case 1 of the video tape cassette comprises a bottom case half 1a and a top case half 1b mated with the bottom case half 1a. Both of the case halves 1a and 1b are made of plastic resin material and are fastened together by means of screws 11. On the bottom plate 1c of the bottom case half 1a of the cassette case 1, there is rotatably mounted a pair of reels 2a and 2b on which a magnetic recording tape 3 is wound. The recording tape 3 can be derived from the take off reel 2a and taken up on the take up reel 2b, and normally stretched along the front walls 4 of the cassette case 1 through a pair of guide pins 16a and 16b disposed at respective corners of the front wall of the bottom case half 1a. The magnetic recording tape 3 can be derived from the openings 8a and 8b defined in the front wall of the cassette case 1 by means of driving means (not shown) of a video tape recording and reproducing device.

On the front wall of the cassette case 1, a protective lid 10 made of plastic resin is movably supported to cover the front wall of the cassette case 1 so that the recording tape 3 can be protected. The lid 10 is so pivoted by the pins 12a and 12b projecting inwardly from both legs 10b, 10b' of the lid 10 that said pins 12a and 12b are rotatably engaged within the corresponding holes 12e defined in the side walls 1d and 1e of the top case half 1b, so that the lid 10 can be opened by rotating it counterclockwise to derive the recording tape from the openings 8a and 8b when the tape cassette is set in a video tape recorder and the lid 10 can be closed by rotating it clock-wise, when it is ejected from the video tape recorder.

Holes 12e may be found in the form of recesses. Furthermore, the pins 12a and 12b may be formed on the both side walls 1d and 1e of the top case half 1b and the holes on the legs 10b and 10b' of the lid 10.

Figure 2:
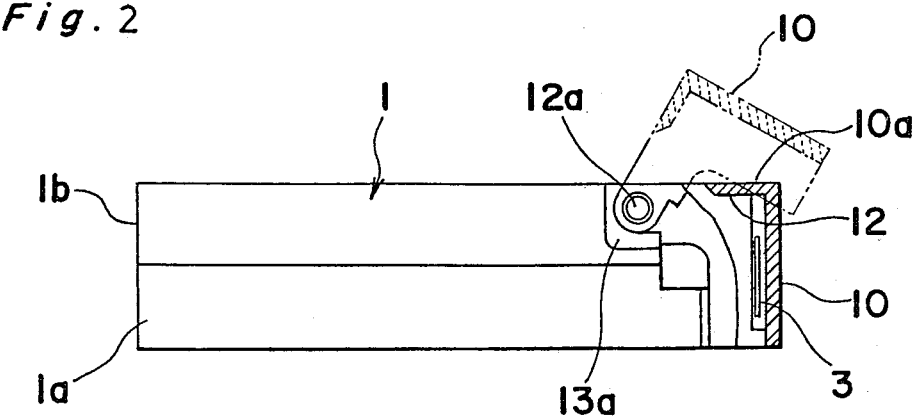
FIG. 2 is a side view of FIG. 1.
Figures 3, 4:
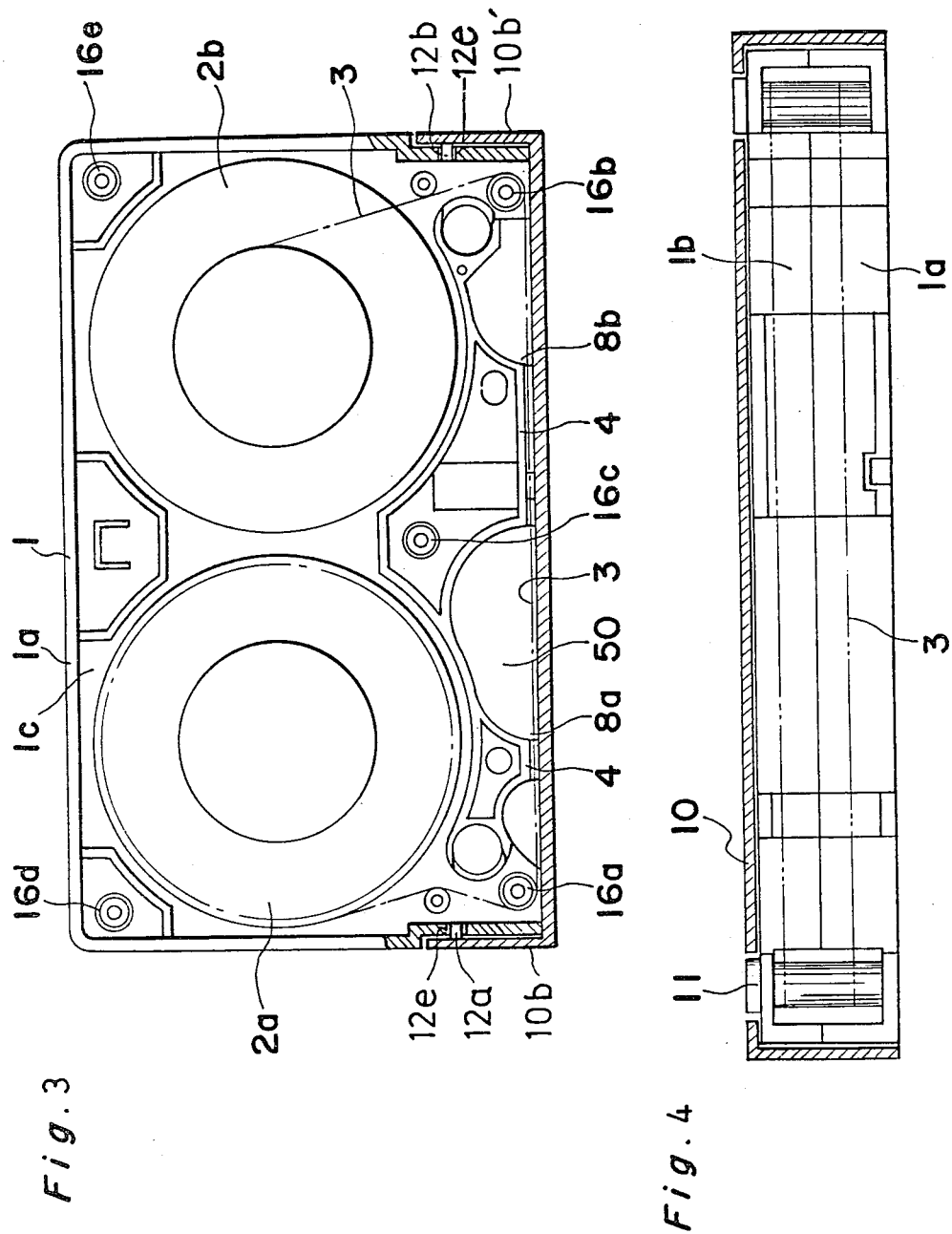
FIG. 3 is a plan view showing the bottom case half of the magnetic recording tape cassette shown in FIG. 1.
FIG. 4 is a front view of the magnetic recording tape cassette shown in FIG. 1.

Lid 10 has an intermediate portion formed in L configuration in cross sectional view and the top horizontal plate portion 10a thereof is adapted to be laid on the upper surface of the front roof portion 12 formed on the front wall of the top case half 1b when the lid is closed as shown in the real line in FIG. 2.

The lid 10 is biased to the closed position by means of coil spring (not shown) and the lid 10 is locked in the closed position by means of a lid locking device (not shown) in the known manner.

In order to fasten the bottom case half 1a and the mating top case half 1b by screws 11, five through holes 14a through 14e are defined at the respective corners of the top case half 1b and the central portion of the front side of the top case half 1b while five bosses 16a through 16e to receive the screws are provided on the bottom plate 1c of the bottom case half 1a corresponding to the respective through holes 14a through 14e. Each of the bosses 16a through 16e has a screw receiving hole 17a through 17e in which the screw is tapped and engaged so that the top case half 1b is fastened with the bottom case half 1a.

In the horizontal plate 10a of the lid 10, there are the respective U shaped openings or recesses 18a and 18b defined at the left end portion and the right end portion of the lid 10 corresponding to the through holes 14a and 14b, said recesses being opened at the backward edge of the plate 10a so that the tapping screws 11 can be entered therein even if the horizontal plate 10a of the lid 10 is laid on the top face of the roof portion 12 of the top case half 1b when the lid is in the closed position. Also the provision of the U shaped openings or recesses 18a and 18b allow the lid 10 to rotate from the closed position to the opened position or vice versa, avoiding the top portion of the tapping screws 11 set in the through holes 14a and 14b.

It is noted that when the lid 10 is attached on the top case half 1b with the pins 12a and 12b engaged within the holes 12e, the legs 10b and 10b' must be slightly outwardly bent. However, the U shaped openings 18a and 18b facilitate the lid 10 to be deformed in order for the legs 10b and 10b' to be bent outwardly when the lid 10 is attached on the top case half 1b without damage of the lid 10.

In the preferred embodiment shown in the Figures, each of the bosses 16a and 16b formed on the front left and right corners of the bottom case half 1a are adapted to serve as tape guide pins.

Figure 5:
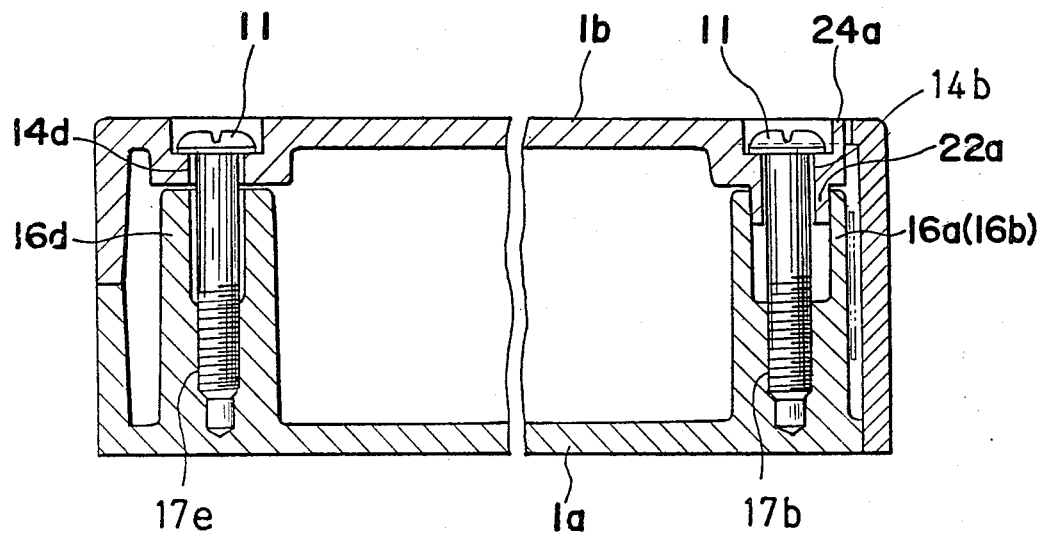
FIG. 5 is a cross sectional view of FIG. 1 taken along the line V—V.
Figure 6:
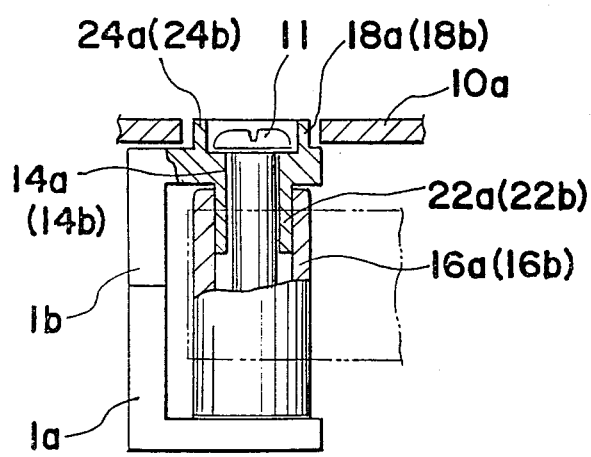
FIG. 6 is a cross sectional view of FIG. 1 taken along the line VI—VI.

In order to keep the tape guide pins or bosses 16a and 16b standing vertically so as to ensure the correct tape running, when the bottom and top case halves 1a and 1b are mated, cylindrical engaging members 22a and 22b formed downwardly around the through holes 14a and 14b of the top case half 1b are respectively mated in the holes of the bosses 16a and 16b as shown in FIG. 5.

In order to facilitate the lid to be mounted on the top case half 1b in the correct position, cylindrical guide members 24a and 24b are formed around the through holes 14a and 14b in the top face of the top case half 1b in such a manner that the cylindrical guide members 24a and 24b are accommodated within the corresponding openings 18a and 18b defined in the horizontal plate 10a of the lid 10. Thus, in the process of mounting the lid 10 on the top case half 1b, the lid can be set in the correct position by adjusting the U shaped openings 18a and 18b with the corresponding guide members 24a and 24b.

Thus according to the magnetic recording tape cassette of the embodiment shown herein, when the magnetic recording tape cassette is manufactured in a factory, the bottom case 1a is placed on a suitable table or a conveyor. After the reels 2a, 2b are mounted in the interior of the bottom case half 1a, the top case half 1b is mated with the bottom case half 1a, the respective tapping screws 11 are inserted through the through holes 14a through 14e of the top case half 1b into the holes of the corresponding bosses 16a through 16e, and the screws 11 are tapped in the bosses 16a through 16e and, thereby causing the bottom case half 1a and the mating top case half 1b to be fastened together.

In FIGS. 1 to 6, the reference numeral 50 denotes the opening defined in the bottom case half 1a to which a tape deriving member of a video tape recorder can be inserted for taking the recording tape out of the cassette case 1.

It is an advantage of the present invention that by entering the tapping screws through the top case half, it makes possible to omit a process of reversing a tape cassette case at the time of fastening the case halves by screws, thus the process of manufacturing the cassette case can be simple and the manufacturing process can be fully automated.

The invention being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A magnetic recording tape cassette which comprises a bottom case half, a top case half mated with said bottom case half to form a cassette case having a front wall with a plurality of openings defined therein, a pair of guide pins provided near the respective front corners of said cassette case, means provided in each of said top case half and bottom case half for receiving screw fastening means for fastening said top case half to said bottom case half, a pair of reels accommodated within said cassette case for receiving a magnetic recording tape, said magnetic recording tape being adapted to be wound about said reels so as to pass along said plurality of openings defined in the front wall of said cassette case and along said pair of guide pins provided near the respective front corners of said cassette case, a protective lid member movably mounted on the front portion of said top case half so as to close or open said openings of said cassette case, said lid member including a horizontal upper plate and a vertical lid plate to form a reverse L configuration in cross-section, a pair of legs formed on each end of said horizontal plate extending perpendicular to the longitudinal direction of said horizontal plate, each of said legs being provided with a means for engaging with corresponding engaging means formed on the side walls of said top case half, said horizontal plate being placed on the frontmost portion of said top case half and a pair of openings defined in the rear edge of said horizontal plate juxtapositioned to each of said legs, each of said openings having an arcuate configuration which allows for the expansion of said legs of said lid member outwardly for engaging said leg engaging means with said corresponding side wall engaging means of said top case half.

2. The magnetic recording tape cassette according to claim 1, wherein said openings in the edge of said horizontal plate of said lid member are U-shaped openings.

3. The magnetic recording tape cassette according to claim 1, wherein said fastening screws are adapted to be entered through holes in said top case half.

4. The magnetic recording tape cassette according to claim 3, wherein a pair of bosses for receiving said screws at the front side of the bottom case half are adapted to serve as tape guide pins.

5. The magnetic recording tape cassette according to claim 1, wherein said openings of said horizontal plate are defined at positions corresponding to holes in said top case half through which screws are entered for fastening said top case half to said bottom case half.

* * * * *